E. HILL, Jr.
PUMP-VALVE.
No. 174,957.  Patented March 21, 1876.
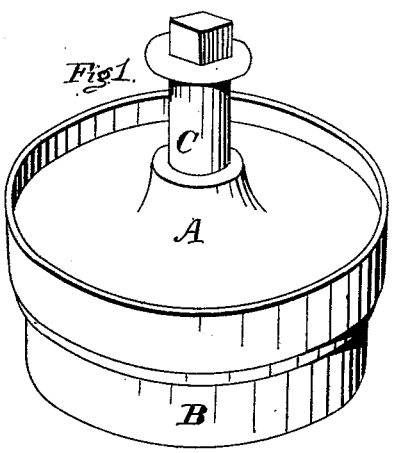
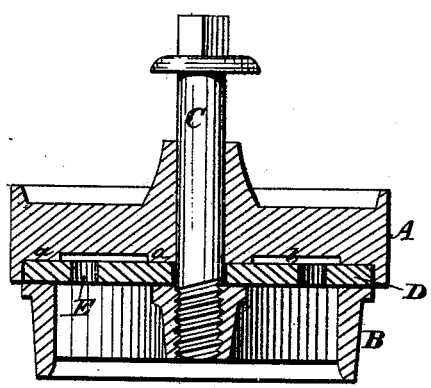
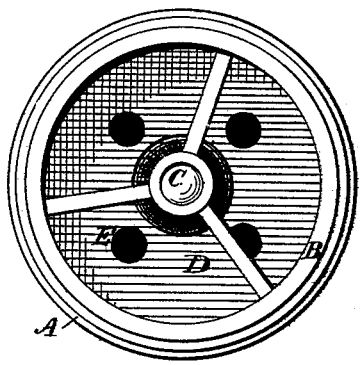
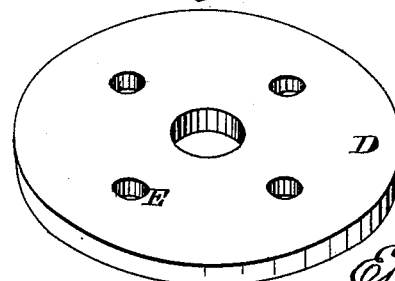
Witnesses:
F. B. Townsend
A. Moon
Inventor:
Ebenezer Hill Jr
by O. T. Earle, atty.

UNITED STATES PATENT OFFICE.

EBENEZER HILL, JR., OF SOUTH NORWALK, CONNECTICUT.

IMPROVEMENT IN PUMP-VALVES.

Specification forming part of Letters Patent No. 174,957, dated March 21, 1876; application filed February 15, 1876.

*To all whom it may concern:*

Be it known that I, EBENEZER HILL, Jr., of South Norwalk, Fairfield county, Connecticut, have invented certain Improvements in Pump-Valves, of which the following is a specification:

This invention relates to that class of valves generally used in pumps, and consists in placing a perforated disk or facing of india-rubber, leather, or other flexible or elastic material suitable for the purpose, within a recess formed in the face of the valve, and confined in such a manner that the said facing or joint will not be raised from its seat or drawn through the bridges or openings in the seat of the valve when operating, as will be hereinafter more fully described.

It is well known that in pump-valves of the various kinds, as ordinarily constructed, when faced with leather or rubber, when in operation, a vacuum is formed between the facing and the under surface of the metal casing or valve proper, which has a tendency to force the elastic material composing the valve-face from a perfect contact with the valve-seat, and especially so when the bridges or ribs in the valve-seat are made wide apart in order to give large openings through the valve whereby to prevent obstructions from lodging upon the spider-ribs and to afford a free and open flow of the fluid through the valve, and made sufficiently strong to support the valve-seat and furnish a secure fastening for the spindle upon which the valve operates.

To overcome the difficulties above enumerated, and furnish a cheap, durable, convenient and reliable valve facing or joint, is the object of my invention.

In the drawings, Figure 1 represent an isometrical view of my invention. Fig. 2 is a vertical cross-section, showing the valve, casing, seat, and elastic disk in position. Fig. 3 is an inverted plan view of the valve, showing the bridges or spider-ribs, spindle, nut or support, perforated disk, or elastic valve facing. Fig. 4 is a perspective plan view of the top of the perforated valve-disk.

Like letters represent corresponding parts in all the figures, in which—

A is the metallic case or top portion of the valve; B, the seat of the valve; C, the spindle; D, the perforated elastic disk; and E, the perforations.

By reference to Fig. 2 it will be seen that A shows the upper portion in section, in which *a a* represent two annular raised surfaces, which form the upper bearings of the valve and the annular recess *b*. D is the perforated disk, through which the result of my invention is attained, by allowing free access of the air or fluid on both sides of the elastic disk, thus balancing the pressure on each side of said disk and preventing its unnecessary displacement or the liability of its rupture from the great strain it would otherwise be subjected to, and which perforations in said disk form the very gist of my invention. B is the valve-seat or lower portion of the valve, the face or upper portion of which combines to form the joint between the perforated disk and the valve A, and which valve-seat is provided with bridges or rib-supports, which serve to prevent the seat from crushing and preventing lateral strain, and also furnish a hub or boss at the intersection of said ribs, into which the valve-spindle C is screwed, said spindle forming a journal or guide, upon which the valve works on approaching and receding from its seat, the operation being as follows: On the displacement taking place consequent on the motion of the piston of the pump, a vacuum is formed above the valve sufficient to raise the same, allowing the fluid to pass through and fill the space unoccupied, when, the return stroke being made, the valve immediately, and with a sudden jar, closes, thus causing the current to change in the direction of the corresponding valve, and causing a strain, due to the weight of the column of water and the velocity of the current, to be brought directly in contact with the exposed portions of the elastic disk or facing, which, if not provided with my improvement, would be drawn into the spaces between the bridges or ribs of the valve, and, thus forced from its proper position, the valve would leak and fail to perform its proper function; but by using my improvement, the pressure is balanced and the valve-disk relieved from the undue strain which, without my improvement, it would be subjected to, and thus the deterioration of the valve-disk is prevented.

Having thus fully described my invention, what I claim as new, and desire to secure by Letters Patent, is—

The combination, in pump-valves, of the perforated elastic or flexible disk D, constructed and arranged substantially in the manner and for the purposes herein set forth.

In testimony that I claim the foregoing as my own invention I affix my signature in the presence of two witnesses.

EBENEZER HILL, Jr.

Witnesses:
 DAVID HILL,
 C. H. DISBROW.